United States Patent [19]

Matsubara

[11] Patent Number: 5,233,279
[45] Date of Patent: Aug. 3, 1993

[54] FEEDBACK-TYPE POSITION CONTROL METHOD

[75] Inventor: Shunsuke Matsubara, Oshino, Japan

[73] Assignee: Fanuc Ltd., Japan

[21] Appl. No.: 720,824

[22] PCT Filed: Oct. 15, 1990

[86] PCT No.: PCT/JP90/01329
§ 371 Date: Jul. 15, 1991
§ 102(e) Date: Jul. 15, 1991

[87] PCT Pub. No.: WO91/07710
PCT Pub. Date: May 30, 1991

[30] Foreign Application Priority Data

Nov. 20, 1989 [JP] Japan .................................. 1-299641

[51] Int. Cl.$^5$ .............................................. G05B 11/01
[52] U.S. Cl. .................... 318/560; 318/615; 318/599; 318/628
[58] Field of Search ............. 318/606, 560, 611, 637, 318/638, 652, 671, 685, 560, 599, 628

[56] References Cited

U.S. PATENT DOCUMENTS 4,788,482 11/1988 Tachibana et al. ............. 318/685 X
4,949,027 8/1990 Baur ................................ 318/685 X
5,015,137 4/1992 Iijima .............................. 318/560 X

FOREIGN PATENT DOCUMENTS 1343999 1/1974 United Kingdom .

Primary Examiner—William M. Shoop, Jr.
Assistant Examiner—Karen Masih
Attorney, Agent, or Firm—Staas & Halsey

[57] ABSTRACT

A feedback-type position control method by which position control can be effected properly and easily in various machines. A pulse number converter (5) obtains the sum of a remainder (Rn−1) for a preceding cycle and the product of the number (xn) of feedback pulses delivered from a pulse coder (4) within a predetermined period and a first conversion coefficient (A) (S1 to S3). If the sum is positive or zero, position feedback pulses corresponding in number to a quotient (yn') obtained by dividing the absolute value of the sum by a second conversion coefficient (B) are delivered, and a remainder (Rn') resulting from the division is stored as a remainder (Rn) used to obtain the sum for the next cycle (S4 to S8). If the sum is negative, the number of position feedback pulses is set at a value (−yn'−1) obtained by subtracting 1 from a value obtained by inverting the sign of the quotient, and a value (B−Rn') obtained by subtracting the remainder from the second conversion coefficient is used as the remainder (S9 and S10). The significance of one position feedback pulse is brought to be equivalent to a movement of a machine movable section for one position command pulse, so that the position control of various machines can be effected by a pulse coder of one type.

5 Claims, 2 Drawing Sheets

FEEDBACK-TYPE POSITION CONTROL METHOD

TECHNICAL FIELD

The present invention relates to a feedback-type position control method, and more particularly, to a method by which position control can be effected properly and easily in machines of various specifications without using various position sensors.

BACKGROUND ART

In a machine which comprises a movable section, connected to a servomotor by means of a rotary-motion-to-linear-motion converter mechanism or the like, and a rotary position sensor attached to the servomotor, as is generally known, the position of the machine movable section is detected according to feedback pulses delivered from the position sensor accompanying the motor rotation, while the machine movable section is being moved by means of the servomotor with the aid of the converter mechanism or the like, whereby position control of the machine movable section is effected. Also known is an arrangement such that position control for a target moved position is finished when the actual moved position of the machine movable section, detected according to the feedback pulses, enters an in-position zone which contains the target position, and a warning is issued to the effect that a deviation between the target moved position and the actual moved position is too large when the positional deviation departs from an allowable range. In consideration of the allowable ranges for the in-position zone and the positional deviation, it is advisable to set a movement of the machine movable section corresponding to the number of input feedback pulses at a value divisible by the pulse number. Meanwhile, a movement of the machine movable section for each revolution of the servomotor varies depending on the equipment arrangement, such as the screw pitch of the rotary-motion-to-linear-motion converter mechanism, the gear ratio of a speed reduction mechanism, etc.

Conventionally, therefore, a position sensor, such as a pulse coder, is used which has a resolution high enough to fulfill the aforementioned requirements for the relationship between the movement of the machine movable section, such as a table, and the feedback pulse number. Used in a machine whose table movement for each revolution of the servomotor is 6 mm, for example, is a pulse coder of a type such that 3,000 pulses are generated with every servomotor revolution in each of two phases with a phase difference of 90°, and feedback pulses are delivered at the leading and trailing edges of each of the generated pulses. In this case, 12,000 feedback pulses are delivered from the pulse coder with every motor revolution, so that the resolution (table movement per one feedback pulse) of the pulse coder is 0.5μ. Used in a machine whose table movement for each motor revolution is 8 mm or 10 mm, according to another example, is a pulse coder of a type such that 8,000 or 10,000 feedback pulses are generated with every motor revolution, that is, the resolution is 1μ or 0.5μ.

The conventional method described above uses a pulse coder whose resolution is suited for the specifications of the machine and servomotor. When controlling the operations of machines and servomotors of various types, therefore, various pulse coders of different resolutions must be provided for use. Naturally, moreover, the types of available pulse coders are limited, so that the machines and servomotors to which the aforementioned conventional method are limited. Furthermore, the management of the machines, servomotors, and pulse coders is complicated.

As another method which fulfills the aforementioned requirements for the relationship between the movement of the machine movable section and the feedback pulse number, use of a control system (FIG. 3) including an optional CMR (command multiplied ratio) 6, whose operation characteristic can be variably adjusted so as to change the significance of a position command depending on the resolution of the pulse coder, is generally known. If a pulse coder 4 which generates one feedback pulse for each table movement of 1μ is used, for example, the operation characteristic of the CMR 6 is set so that one movement command pulse is delivered from the CMR when a movement command (variation of position command) of 1μ is applied to the input of the CMR. If another pulse coder 4 which generates, e.g., 2.5 feedback pulses for each table movement of 1μ is used, moreover, the operation characteristic of the CMR 6 is set so that two or three movement command pulses are alternately generated, and therefore, 2.5 movement command pulses are delivered on the average when 1-μ movement commands are inputted in succession.

Even though the movement command is fixed, however, different numbers of movement command pulses are delivered from optional CMRs 6 with different operation characteristics. According to the aforementioned conventional method in which the operation characteristic of the CMR 6 is variably set, therefore, the in-position zone, used to discriminate the arrival at the target position, and the allowable range, used to detect an excessive positional deviation, must be modified every time the operation characteristic of the CMR 6 is changed. Naturally, moreover, the setting range for the operation characteristic of the CMR 6 is limited, so that available pulse coders for the execution of the aforementioned conventional method are limited.

DISCLOSURE OF THE INVENTION

The object of the present invention is to provide a feedback-type position control method by which position control can be effected properly and easily in various machines without using various position sensors.

In order to achieve the above object, the present invention comprises the steps of (a) inputting feedback pulses delivered from a rotary position sensor with rotation of a servomotor, (b) converting the thus inputted feedback pulses into position feedback pulses having a pulse number capable of dividing a movement of a machine movable section corresponding to the number of the input pulses, and (c) executing position control in response to the position feedback pulses.

According to the present invention, as described above, the feedback pulses delivered from the rotary position sensor accompanying the rotation of the servomotor are converted into the position feedback pulses having the pulse number capable of dividing the movement of the machine movable section corresponding to the number of the feedback pulses, so that the significance of one input feedback pulse, and therefore, the significance of the position feedback pulse, can be properly set in accordance with the specifications of the machine. As a result, the position control of machines of various specifications can be executed by using a position sensor of one type, and it is unnecessary to selectively use various position sensors depending on the types of the machines and servomotors. Thus, the complicated management of the machines, servomotors, and position sensors are needless, and there are no restrictions on the respective specifications of the machines, servomotors, and position sensors. Furthermore, the in-position zone, used to discriminate the arrival at the target position, and the allowable position deviation range, used to detect an excessive positional deviation, can be properly set, and the set values need not be frequently modified.

BEST MODE OF CARRYING OUT THE INVENTION

Figure 1:
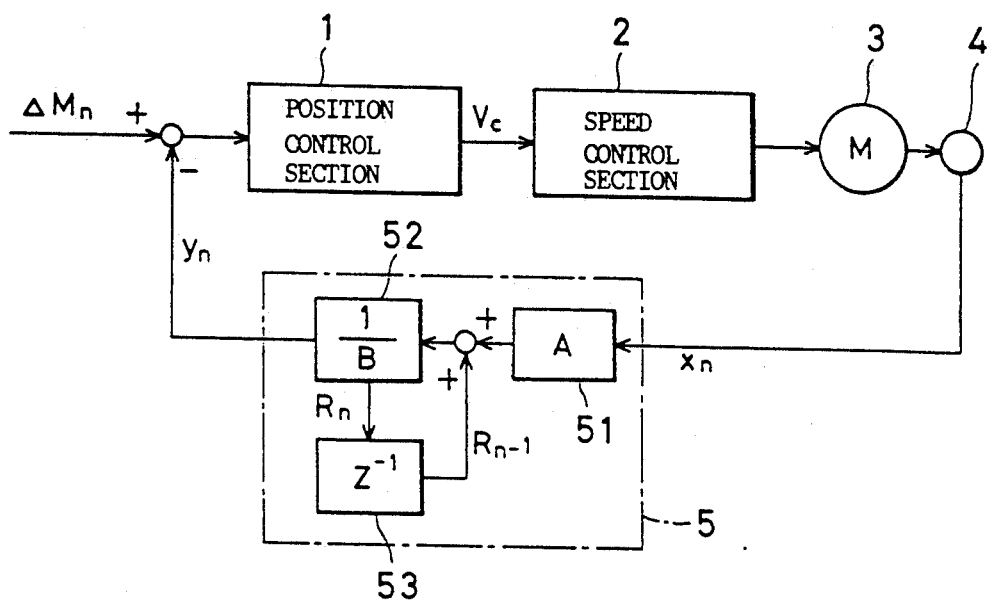
FIG. 1 is a functional block diagram showing a digital servo system for embodying a feedback-type position control method according to one embodiment of the present invention.

Referring to FIG. 1, a servo system for embodying a position control method according to an embodiment of the present invention comprises a digital servo circuit for accomplishing the respective functions of a position control section 1, a speed control section 2, and a pulse number converter means (optional DMR) 5, the servo circuit including a processor (not shown) used to execute software processing for fulfilling the respective functions of those elements. A servomotor 3 is fitted with a rotary position sensor, such as a pulse coder 4, which is designed so as to deliver, e.g., 40,000 feedback pulses while the servomotor 3 makes one revolution.

Functionally, the digital servo circuit is arranged to convert the feedback pulses delivered from the pulse coder 4 into position feedback pulses by means of the optional DMR 5, as described in detail later, obtain a speed command Vc in the position control section 1 on the basis of a deviation (positional deviation) between the number of position feedback pulses and a position command $\Delta Mn$ distributed from a numerical control device for use as a host control device, and execute proportional-plus-integral control and the like in the speed control section 2 on the basis of the speed command Vc, thereby obtaining a torque command. The servo system, which is provided with a PWM control circuit (not shown) for generating a PWM signal from the torque command, is operable to drive the servomotor 3 by the use of the PWM signal. A machine, which is operated under the control of the servo system, includes a rotary-motion-to-linear-motion converter mechanism which is formed of, for example, a ball screw/ball nut mechanism disposed between a speed reducer, connected to the output shaft of the servomotor 3, and a machine movable section such as a table.

More specifically, the optional DMR 5 is operable to deliver yn number of position feedback pulses depending on an input pulse number xn and a pulse number conversion coefficient yn/xn which can be set variably when it is supplied with the xn number of feedback pulses, thereby making the significance of one input feedback pulse, and therefore, the significance of one position feedback pulse, changeable. Further specifically, a command movement of the machine movable section for each pulse of the position command $\Delta Mn$ is determined depending on the specifications of the servo system and the servomotor and the specifications of the machine, such as the ball screw pitch, the gear ratio of the speed reducer, etc., while the resolution of the pulse coder 4 (actual movement of the machine movable section sufficient for the delivery of one feedback pulse from the pulse coder 4) is determined depending on the specifications of the pulse coder 4. Accordingly, the pulse number conversion coefficient yn/xn is set so that the significance of one position feedback pulse (actual movement of the machine movable section sufficient for the delivery of one position feedback pulse from the optional DMR 5) is equivalent to the command movement for each position command pulse.

If the command movement of the machine movable section for each position command pulse is 1 $\mu$, and if the number of feedback pulses delivered from the pulse coder 4 for each revolution of the servomotor 3 is 40,000, for example, the pulse number conversion coefficient yn/xn is set at 3/20, 1/5, ¼, and 3/10 in cases where the method of the present embodiment is applied to machines in which the actual movement of the machine movable section for each revolution of the servomotor is 6 mm, 8 mm, 10 mm, and 12 mm, respectively. If the command movement of the machine movable section for each position command pulse, the number of feedback pulses delivered for each motor revolution, and the actual movement of the machine movable section for each motor revolution are 0.5 $\mu$, 40,000, and 6 mm, respectively, the pulse number conversion coefficient yn/xn is set at 3/10.

The processor of the digital servo circuit, which is operable to execute the software processing, including a position loop process, speed loop process, and optional DMR process, in order to fulfill the respective functions of the position control section 1, the speed control section 2, and the optional DMR 5 of FIG. 1, as described above, is so arranged as to execute the software processing at intervals of a predetermined cycle. In this case, if the number of position feedback pulses is calculated by simply multiplying the number of feedback pulses delivered from the pulse coder 4 within one processing cycle by the conversion coefficient yn/xn, the calculation result generally involves a fraction, so that position control is subject to an error. In order to obviate this, the optional DMR 5 of the present embodiment comprises a first arithmetic logical unit 51 for multiplying the number xn of feedback pulses delivered from the pulse coder 4 within one processing cycle by a conversion coefficient A, a second arithmetic logical unit 52 for dividing the sum of the remainder Rn−1 and the product of the pulse number xn and the coefficient A by a second conversion coefficient B and delivering position feedback pulses corresponding in number to the quotient resulting from this calculation, and a storage unit 53 for storing the remainder Rn resulting from the calculation in the second arithmetic logical unit.

Figure 2:
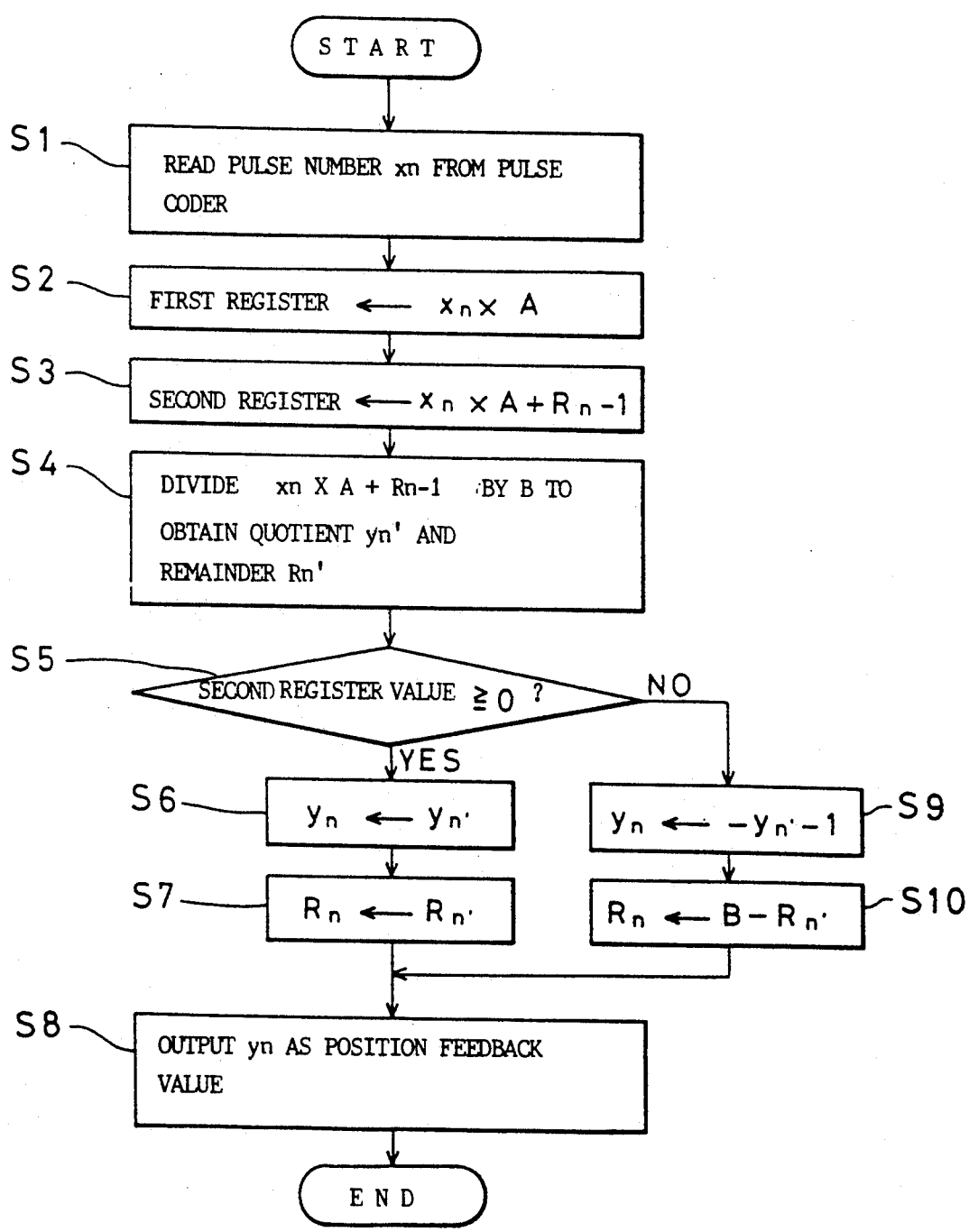
FIG. 2 is a flow chart illustrating an optional DMR process executed by means of a processor of the digital servo system.

Referring now to FIG. 2, the optional DMR process executed by means of the processor of the digital servo circuit of FIG. 1 will be described.

The processor reads the number xn of feedback pulses delivered from the pulse coder 4 within a period corresponding to the present processing cycle (Step S1), multiplies the pulse number xn by the first conversion coefficient A, and loads the resulting value xn·A into a first register (Step S2). Then, the processor adds the remainder $R_{n-1}$ obtained as a result of the calculation in the preceding cycle to the value stored in the first register, and loads the resulting value $x_n \cdot A + R_{n-1}$ into a second register (Step S3). Further, the processor divides the absolute value $|x_n \cdot A + R_{n-1}|$ of the value stored in the second register by the second conversion coefficient B, thereby obtaining a quotient $y_n'$ and a remainder $R_n'$ (Step S4).

Then, the processor determines whether or not the stored value $x_n \cdot A + R_{n-1}$ of the second register is positive or zero (Step S5). If the result of the decision is affirmative, the quotient $y_n'$ and the remainder $R_n'$ obtained in Step S4 are loaded, as the position feedback pulse number $y_n$ and the remainder $R_n$ for the present processing cycle, into third and fourth registers, respectively (Steps S6 and S7). If the result of the decision in Step S5 is negative, on the other hand, the value 1 is subtracted from a value $-y_n'$ obtained by inverting the sign of the quotient $y_n'$ obtained in Step S4, and the resulting value $(-y_n' - 1)$ is loaded as the position feedback pulse number $y_n$ for the present processing cycle into the third register (Step S9). Then, the remainder $R_n'$ obtained in Step S4 is subtracted from the second conversion coefficient B, and the resulting value $(B - R_n')$ is loaded as the remainder $R_n$ for the present processing cycle into the fourth register (Step S10).

In Step S8 directly following Step S7 or S10, the processor reads out the position feedback pulse number $y_n$ for the present processing cycle loaded in Step S6 or S9, whereupon the optional DMR process for the present processing cycle ends. Then, the position loop control process based on the pulse number $y_n$ is entered.

TABLE 1

| xn | yn | Rn | Σxn | Σyn |
|---|---|---|---|---|
| 0 | 0 | 0 | 0 | 0 |
| 1 | 0 | 3 | 1 | 0 |
| 2 | 1 | 4 | 3 | 1 |
| 3 | 2 | 3 | 6 | 3 |
| 4 | 3 | 0 | 10 | 6 |
| 5 | 3 | 0 | 15 | 9 |
| 6 | 3 | 3 | 21 | 12 |
| 5 | 3 | 3 | 26 | 15 |
| 4 | 3 | 0 | 30 | 18 |
| 3 | 1 | 4 | 33 | 19 |
| 2 | 2 | 0 | 35 | 21 |
| 1 | 0 | 3 | 36 | 21 |
| 0 | 0 | 3 | 38 | 21 |

TABLE 2

| xn | yn | Rn | Σxn | Σyn |
|---|---|---|---|---|
| 0 | 0 | 3 | 36 | 21 |
| −1 | 0 | 0 | 35 | 21 |
| −2 | −2 | 4 | 33 | 19 |
| −3 | −2 | 5 | 30 | 17 |
| −4 | −2 | 3 | 26 | 15 |
| −5 | −3 | 3 | 21 | 12 |
| −6 | −4 | 5 | 15 | 8 |
| −5 | −3 | 5 | 10 | 5 |
| −4 | −2 | 3 | 8 | 3 |
| −3 | −2 | 4 | 3 | 1 |
| −2 | −1 | 3 | 1 | 0 |
| −1 | 0 | 0 | 0 | 0 |
| 0 | 0 | 0 | 0 | 0 |

If the conversion coefficient A/B in the optional DMR 5 is set at 3/5, and if the feedback pulse number $x_n$ for each processing cycle increases one by one from 1 to 6, and then decreases one by one, the position feedback pulse number $y_n$, remainder $R_n$, cumulative feedback pulse number $\Sigma x_n$, and cumulative position feedback pulse number $\Sigma y_n$ for each processing cycle vary as shown in Table 1. In the meantime, the respective initial values of the parameters $x_n$ to $\Sigma y_n$ are zero. Thereafter, if the servomotor 3 rotates reversely, and if the feedback pulse number $x_n$ for each processing cycle changes in like manner, the parameters $y_n$, $R_n$, $\Sigma x_n$, and $\Sigma y_n$ vary as shown in Table 2.

The present invention is not limited to the embodiment described above, and various modifications may be effected therein.

Figure 3:
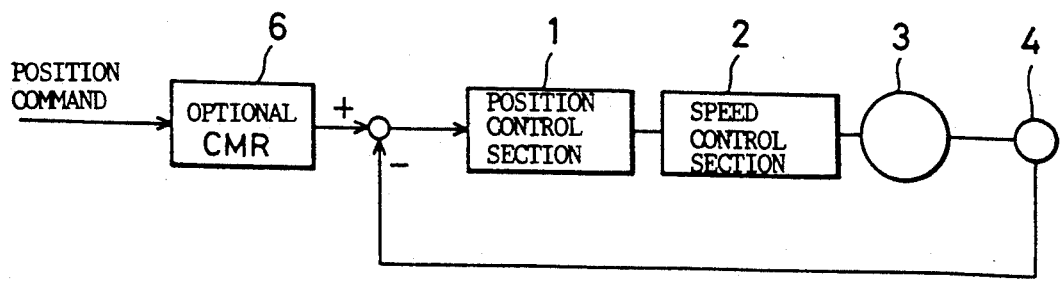
FIG. 3 is a schematic block diagram showing a conventional servo system including an optional CMR.

For example, the present invention may be embodied using a servo system which is provided with the optional CMR 6 shown in FIG. 3. In this case, it is necessary only that the significance of one position feedback pulse be equivalent to that of one pulse delivered from the optional CMR 6.

In the embodiment described above, moreover, the first conversion coefficient A is set to a value equal to or smaller than that of the second conversion coefficient B, that is, the conversion coefficient A/B in the optional CMR 6 is set equal to or smaller than the value 1. If a low-resolution pulse coder is used, however, the first conversion coefficient A may be set at a value greater than that of the second conversion coefficient B so that the conversion coefficient A/B in the optional CMR 6 is greater than the value 1.

I claim:

1. A feedback-type position control method comprising the steps of:
   (a) inputting a number of feedback pulses delivered from a rotary position sensor in dependence upon rotation of a servomotor;
   (b) converting the feedback pulses inputted in step (a) into position feedback pulses having a pulse number capable of controlling a movement of a machine movable section according to predetermined increments in dependence upon the number of the feedback pulses inputted in step (a); and
   (c) executing position control in dependence upon the position feedback pulses.

2. A feedback-type position control method according to claim 1,
   wherein said inputting in step (a) includes the sub-step of cyclically receiving the feedback pulses in cycles having intervals of a predetermined period, and
   wherein said converting in step (b) includes the sub-steps of:
   (b1) obtaining a product of the number of feedback pulses received in each cycle times a first conversion coefficient;
   (b2) obtaining a quotient and a remainder by dividing a sum of the product in each cycle and the remainder in a preceding cycle by a second conversion coefficient;
   (b3) storing the remainder obtained in step (b2) to obtain the sum for a following cycle; and
   (b4) outputting the position feedback pulses equal in number to the quotient obtained in step (b2).

3. A feedback-type position control method according to claim 2, wherein the first conversion coefficient is set at a value smaller than that of the second conversion coefficient.

4. A feedback-type position control method according to claim 1,
   wherein said inputting in step (a) includes the sub-step of cyclically receiving the inputted feedback pulses in cycles having intervals of a predetermined period, and
wherein said step (b) includes the sub-steps of:
(b1) obtaining a product of the number of feedback pulses received in a current cycle times a first conversion coefficient;
(b2) obtaining in each cycle a sum of the product obtained in step (b1) for the current cycle and a preceding cycle remainder;
(b3) obtaining a quotient and a remainder by dividing the absolute value of the sum obtained in step (b2) by a second conversion coefficient;
(b4) outputting the position feedback pulses equal in number to the quotient when the sum in step (b2) is positive or zero and storing the remainder obtained in step (b3) for use as the preceding cycle remainder to obtain the sum for a following cycle, and
(b5) outputting the position feedback pulses equal in number to a value obtained by subtracting 1 from a value obtained by inverting the sign of the quotient when the sum is negative and storing a value obtained by subtracting the remainder obtained in step (b3) from the second conversion coefficient as the preceding cycle remainder used to obtain the sum for the following cycle.

5. A feedback-type position control method according to claim 4, wherein the first conversion coefficient is set at a value smaller than that of the second conversion coefficient.

* * * * *

UNITED STATES PATENT AND TRADEMARK OFFICE
CERTIFICATE OF CORRECTION

PATENT NO. : 5,233,279
DATED : August 3, 1993
INVENTOR(S) : Shunsuke Matsubara

It is certified that error appears in the above-indentified patent and that said Letters Patent is hereby corrected as shown below:

On the Title Page, Item [56]; the reference "5,015,137" should be --5,105,137--.

Column 4, line 23, "¼" should be --1/4--.

Column 5, Table 1, in Column 4 of the table, "38" should be --36--.

Column 5, Table 2, in Column 4 of the table, "8" should be --6--.

Column 7, Claim 4(b4), delete "in step (b2)".

Signed and Sealed this

Nineteenth Day of April, 1994

Attest:

BRUCE LEHMAN

Attesting Officer     Commissioner of Patents and Trademarks